C. B. PARSONS.
WRENCH.
APPLICATION FILED FEB. 15, 1922.
1,424,676.
Patented Aug. 1, 1922.
2 SHEETS—SHEET 1.
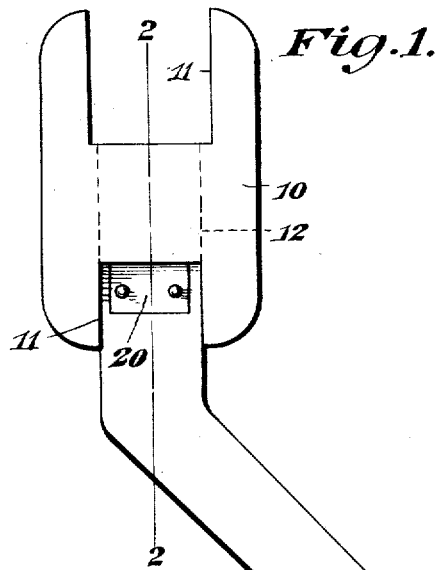
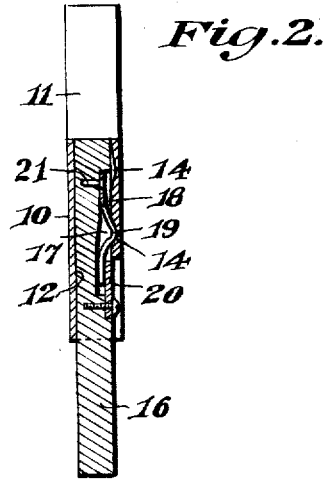
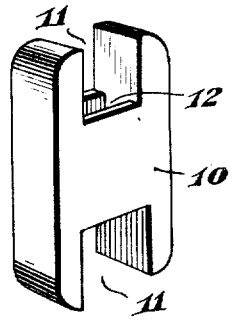
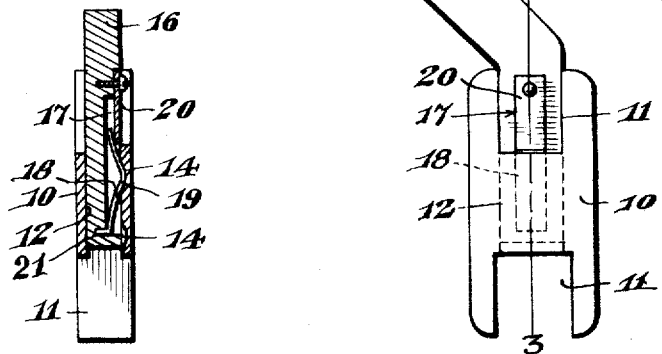
C. B. Parsons, INVENTOR.
BY
Geo. P. Kimmel, ATTORNEY.

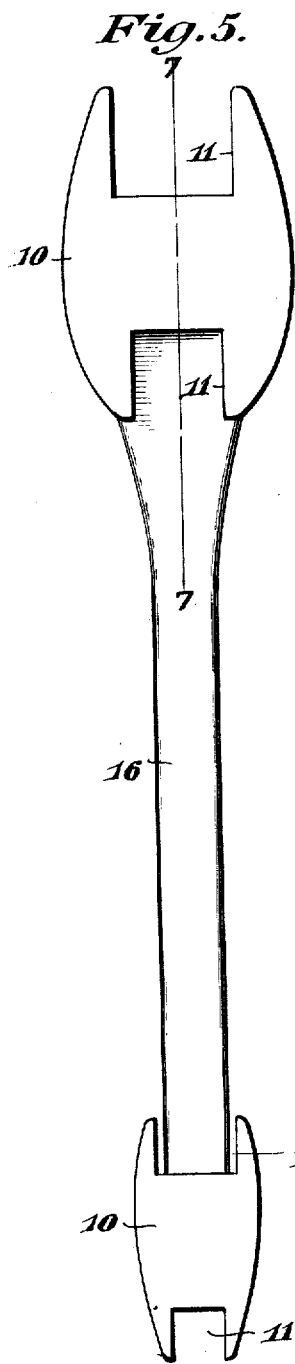
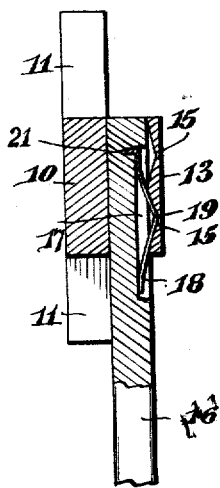
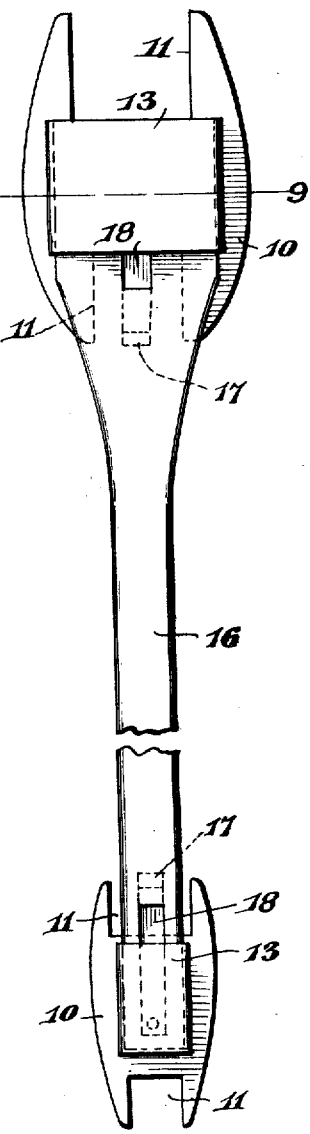
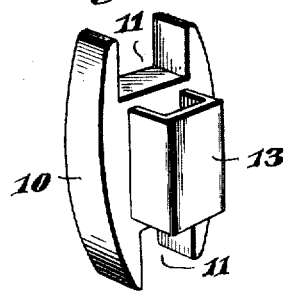
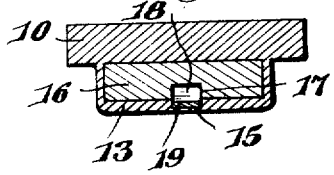

UNITED STATES PATENT OFFICE.

CLARENCE B. PARSONS, OF SWEET SPRINGS, MISSOURI.

WRENCH.

1,424,676.  Specification of Letters Patent.  Patented Aug. 1, 1922.

Application filed February 15, 1922. Serial No. 536,779.

*To all whom it may concern:*

Be it known that I, CLARENCE B. PARSONS, a citizen of the United States, residing at Sweet Springs, in the county of Saline and State of Missouri, have invented certain new and useful Improvements in Wrenches, of which the following is a specification.

This invention relates to wrenches and has for one of its objects to provide a device of this character including a handle and a detachable head provided with a plurality of jaws to fit different sized nuts and adapted to be turned end for end on the handle to bring the various jaws one at a time into operative position.

With these and other objects in view, the invention consists in certain novel features of construction as hereinafter shown and described and then specifically pointed out in the claims, and in the drawings illustrative of the preferred embodiment thereof:—

Figure 1 is a side elevation of the improved implement.

Fig. 2 is a section on the line 2—2 of Fig. 1.

Fig. 3 is a section on the line 3—3 of Fig. 1.

Fig. 4 is a perspective view of the detachable jaw.

Fig. 5 is a side elevation of a modified form viewed from one side.

Fig. 6 is a side elevation of a modified form viewed from the other side.

Fig. 7 is a section on the line 7—7 of Fig. 5.

Fig. 8 is a perspective view of the modified form of jaw shown in the structure disclosed in Figs. 5 and 6.

Fig. 9 is a section on the line 9—9 of Fig. 6.

The improved wrench comprises a head member represented as a whole at 10 and with jaws 11 of different sizes to fit different sized nuts. The head is provided with a longitudinally directed socket extending between the jaws. In Figs. 1, 2, 3 and 4, the socket is wholly within the lines of the head as indicated at 12, while in the modified structure shown in Figs. 5 to 9, the socket is produced by an outwardly directed hood like member 13, attached to and formed integral with the head 10, as illustrated.

Formed within the inner face of the socket 12 are recesses or seats 14 in spaced relation, while similar recesses or seats 15 are formed in the inner face of the hood member 13.

Preferably two of the heads 10 will be employed one at each end of the handle, as shown, to multiply the number of the jaws of different sizes.

The handle is represented as a whole at 16, and may be in S form as in Fig. 1, or straight as in Figs. 5 and 6, or other form as desired.

The ends of the handle are formed to closely fit in the sockets 12 or within the hoods 13 as the case may be, and are provided at each end with a longitudinally directed recess indicated at 17 to receive a resilient holding member 18.

Each of the holding members is formed with an outwardly directed bend 19 to engage alternately in the seats 14 or 15 and thus form resilient catches to yieldably "lock" the handle to the head.

In the structure shown in Figs. 1, 2 and 3, a keeper plate 20 is attached to the handle 16 and extends over a portion of the longitudinal recess 17, and one end of the latch member 18 extends beneath the keeper, while the other end of the latch member butts against the opposite end of the seat 17, as shown in Figs. 2 and 3.

The keeper 20 at one end of the handle is wider than the seat 17, while at the other end the keeper is substantially the same width as the seat. Either size may be employed as required.

The keepers 20 are sunken into the material of the handle so that the outer faces of the keepers are flush with the adjacent faces of the stock 16.

By this means the latch member is held in position by the keeper without other fastening means.

The latch member 18 is preferably apertured to receive a pin 21 which extends into a recess or seat in the stock 10, as illustrated in Fig. 2, to hold the member 18 from displacement.

The extension 21 holds the member 18 in position, and the latter requires no other fastening means.

The members 17 possess sufficient strength to hold the heads 10 from displacement while in use, as the handle and heads are subjected to very little strain longitudinally of the handle, while at the same time, the heads can be readily detached and changed end for end to present the required size of jaw in operative position.

The improved implement is simple in construction, can be inexpensively manufactured of any required size, is formed with few parts and is therefore not liable to get out of order.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

1 A wrench including a head having a plurality of nut engaging jaws and a handle receiving socket between the contiguous ends of the jaws, said socket having spaced recesses in its interior, a handle adapted to be seated in said socket from either end, and a yieldable catch carried by said handle and engageable with said recesses to yieldably lock the handle to the head.

2. A wrench including a head having a plurality of nut engaging jaws and a handle receiving socket between the contiguous ends of the jaws, said socket having spaced interior recesses, a handle adapted to be seated in said socket from either end and having a longitudinally directed seat in one face, a keeper attached to the handle and extending over a portion of the seat, a holding spring bearing within said seat with one end beneath said keeper and the intermediate portion bowed outwardly to project alternately into the recesses in the socket.

In testimony whereof, I affix my signature hereto.

CLARENCE B. PARSONS.